April 25, 1933.  T. A. FEDERWITZ ET AL  1,906,051
CONVEYING SYSTEM
Filed Nov. 24, 1928  8 Sheets-Sheet 1

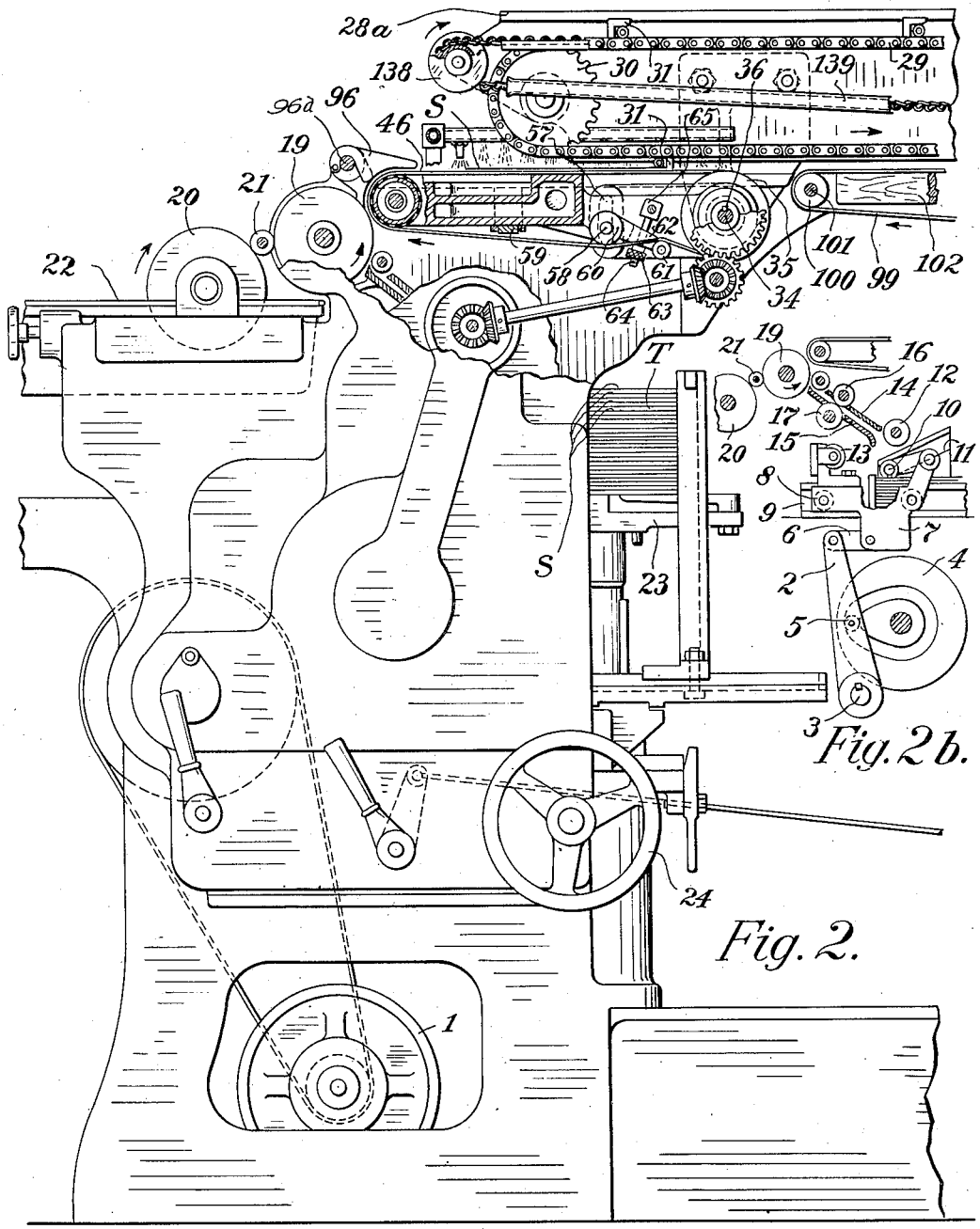
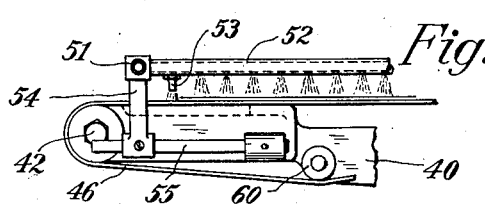

April 25, 1933.   T. A. FEDERWITZ ET AL   1,906,051
CONVEYING SYSTEM
Filed Nov. 24, 1928   8 Sheets-Sheet 3

INVENTORS
Theodore A. Federwitz
and Walter V. Bailey
BY
their ATTORNEY.

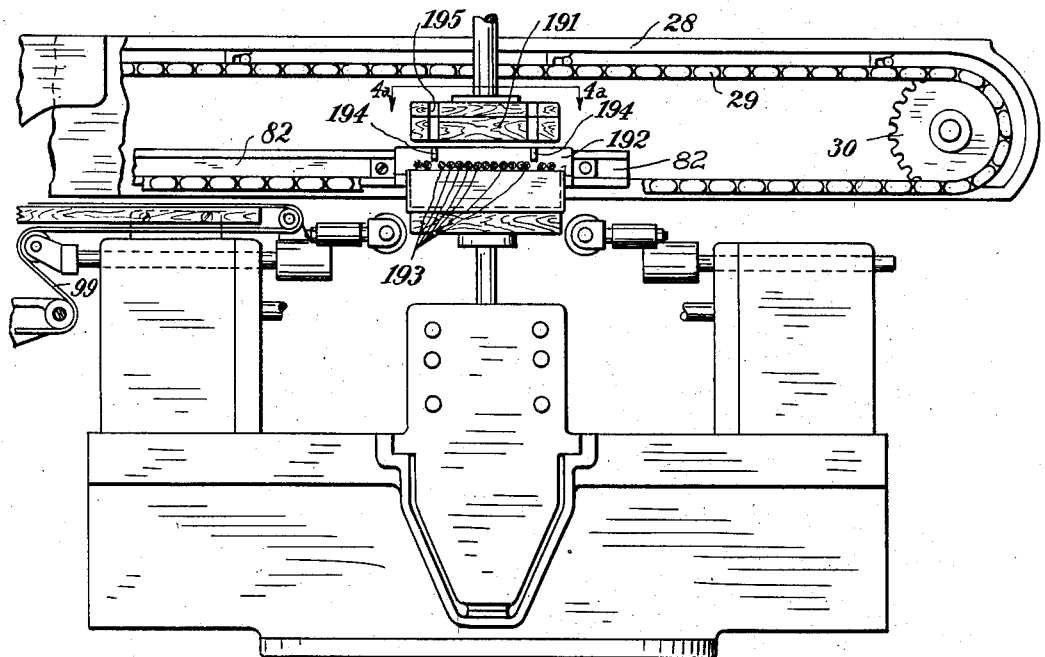
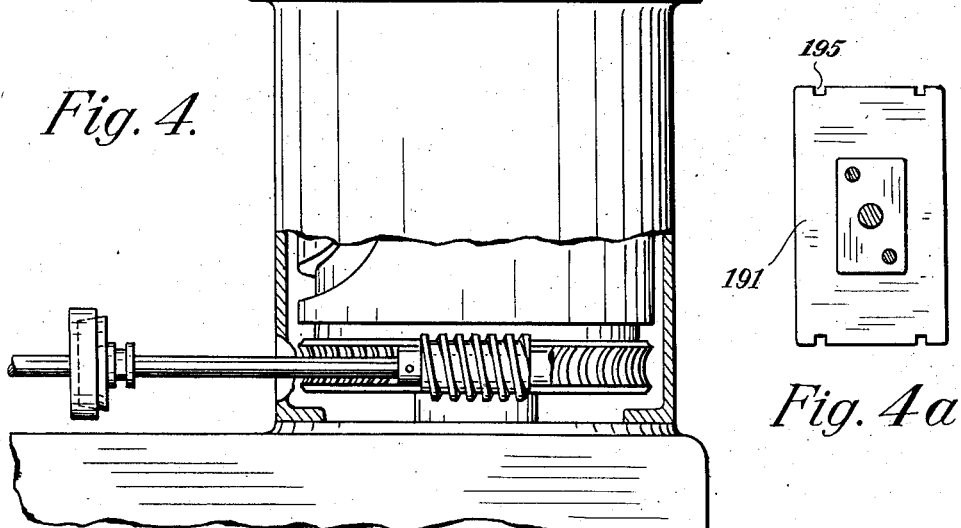
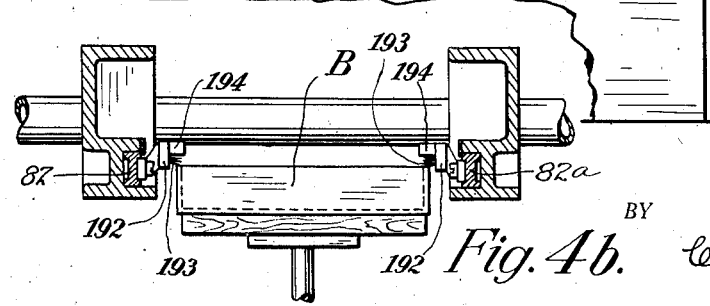
Fig. 4.
Fig. 4a.
Fig. 4b.

April 25, 1933.  T. A. FEDERWITZ ET AL  1,906,051
CONVEYING SYSTEM
Filed Nov. 24, 1928  8 Sheets-Sheet 6
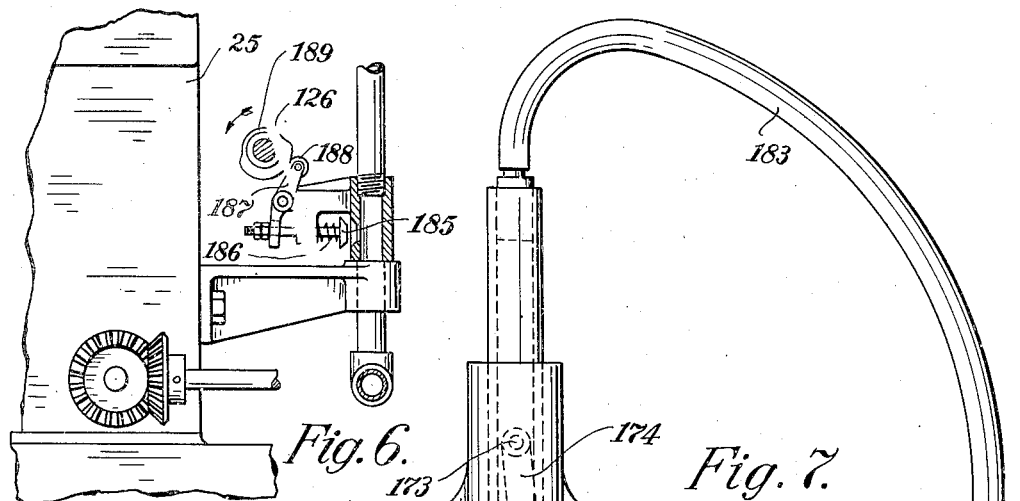
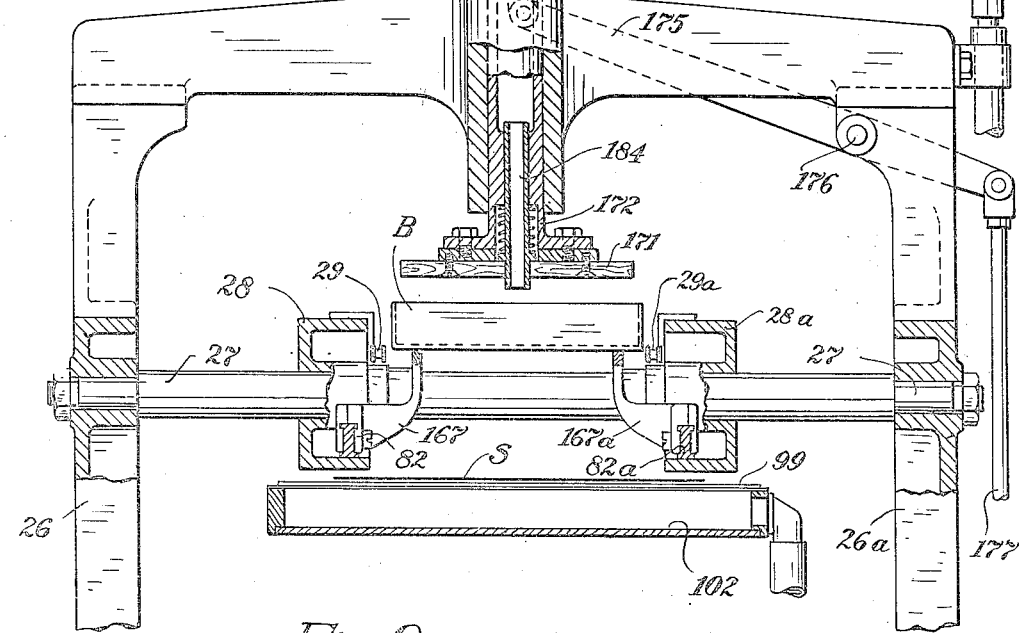
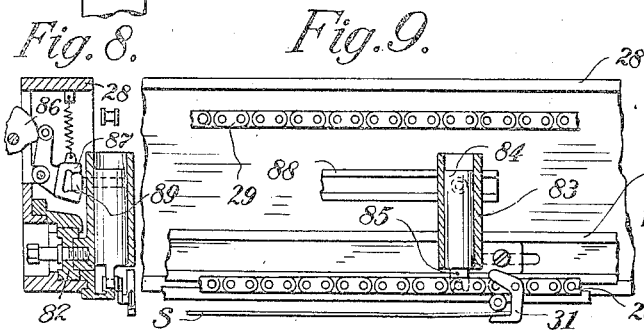
INVENTORS
Theodore A. Federwitz
and Walter F. Bailey
BY Cornelius L. Ehret
their ATTORNEY.

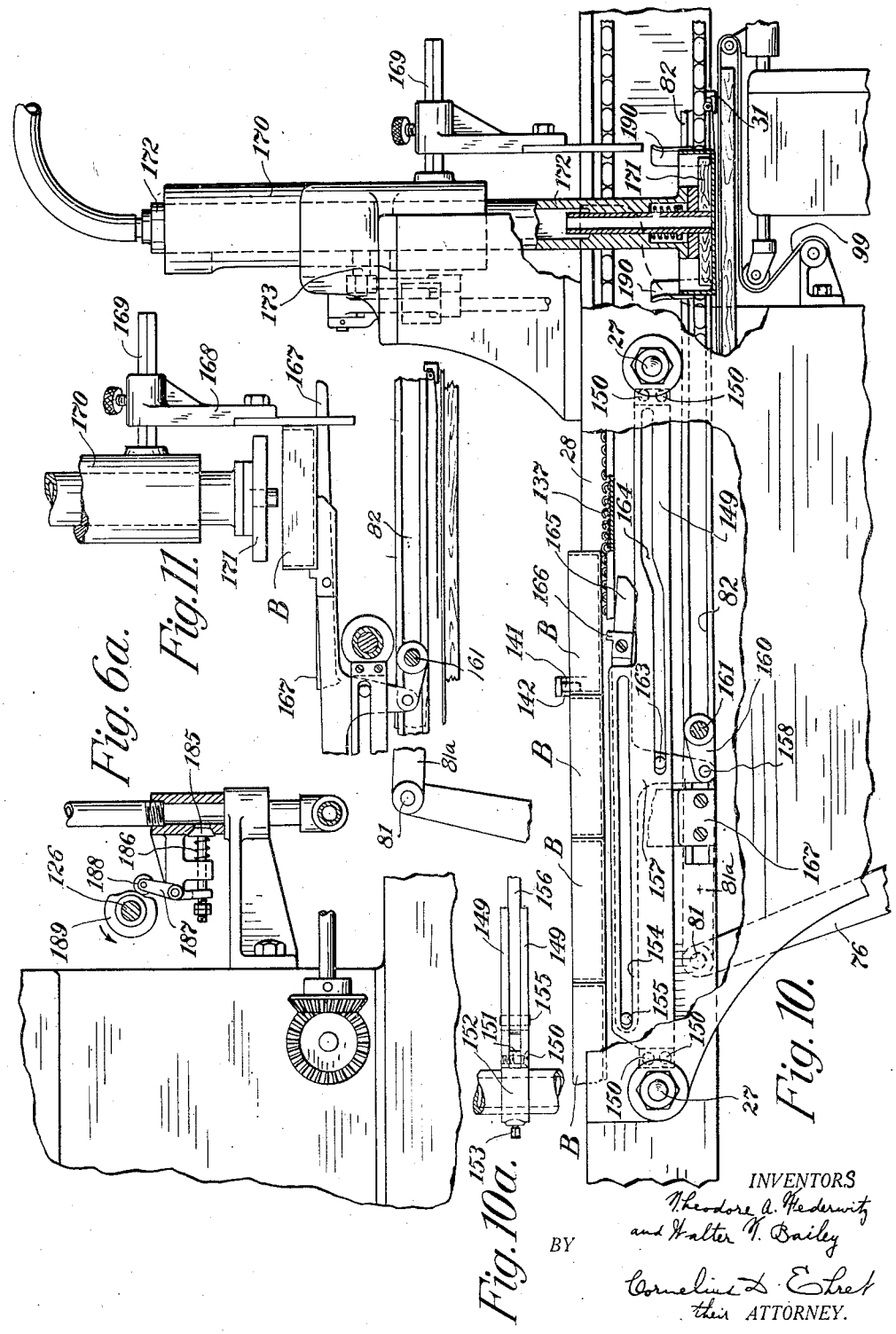

April 25, 1933. T. A. FEDERWITZ ET AL 1,906,051
CONVEYING SYSTEM
Filed Nov. 24, 1928  8 Sheets-Sheet 8

INVENTORS
Theodore A. Federwitz and
Walter T. Bailey
BY
Cornelius D. Ehret
their ATTORNEY.

Patented Apr. 25, 1933

1,906,051

UNITED STATES PATENT OFFICE

THEODORE A. FEDERWITZ AND WALTER T. BAILEY, OF PHILADELPHIA, PENNSYLVANIA, ASSIGNORS TO STOKES AND SMITH COMPANY, OF PHILADELPHIA, PENNSYLVANIA, A CORPORATION OF PENNSYLVANIA

CONVEYING SYSTEM

Application filed November 24, 1928. Serial No. 321,635.

Our invention relates to a method of and apparatus for applying wrappers, sheets, labels, or equivalent, hereinafter termed "wrappers," to boxes, packages, containers, unstayed boxes, box blanks, or equivalent, hereinafter termed boxes, and more particularly to a system or combination synchronized or operating in definitely timed relation for delivering to wrapping or covering machine boxes, wrappers, or both boxes and wrappers.

In accordance with our invention, wrappers are moved, particularly by a series of intermittent steps, along a path, as toward a wrapping station, and at a point or region in the path, each wrapper in succession meets or is engaged by a box, preferably while the wrapper is at rest, and thereafter the box and wrapper move as a unit to the wrapping station; more particularly, the boxes are moved in a separate path and at a predetermined point each in turn is engaged by a movable structure, as a plunger, to which it is held, preferably by suction, and transported into adhesive engagement with a wrapper in proper register therewith.

Further in accordance with our invention, the wrappers are conveyed by belts or chains having gripper elements clamping the leading edges of the sheets, the major portion of the sheet or wrapper being in engagement with a movable belt, or equivalent, and preferably held thereagainst by suction; more particularly to flatten the wrapper on the belt particularly before deposition of a box thereon, the belt, preferably while the wrapper and conveyer chain are stationary, is moved in a reverse direction to a desired extent.

Further in accordance with our invention and more particularly, the wrappers, as they leave an adhesive applying roll, are moved into engagement with conveyer structure, preferably narrow spaced belts, and held thereagainst by suction; more particularly, an air blast holds the wrappers flat on the belts and preferably, the air blast, as the front edge of each wrapper in turn is positioned with the aforesaid grippers, destroys the suction acting on the wrapper.

Our invention also resides in features of construction, arrangement, and operation herein described and claimed.

For an illustration of one of the various forms our invention may take, reference is to be had to the accompanying drawings, in which:

Fig. 2 is a side elevational view, partly in section, on an enlarged scale, of the adhesive applying unit and part of the conveyer mechanism shown in Fig. 1.

Figs. 2a and 2b are detailed views of wrapper feeding and conveyer mechanism of Fig. 2.

Fig. 4 is a side elevational view with parts in section of the wrapping machine shown in Fig. 1.

Figs. 4a and 4b are detailed views of parts shown in Fig. 4.

Figs. 6 and 6a are detailed views of suction cut-off mechanism.

Fig. 7 is a front elevational view of the box transferring mechanism shown in Fig. 1.

Figs. 8 and 9 are fragmentary front and side elevational views showing details of construction of the conveyer mechanism.

Fig. 10 is a side elevational view with parts broken away, and parts in section, disclosing the construction of box-conveying and transfer mechanisms.

Fig. 10a is a fragmentary top plan view of parts shown in Fig. 10.

Fig. 11 shows mechanism of Fig. 10 in another position.

Figures 1, 16:
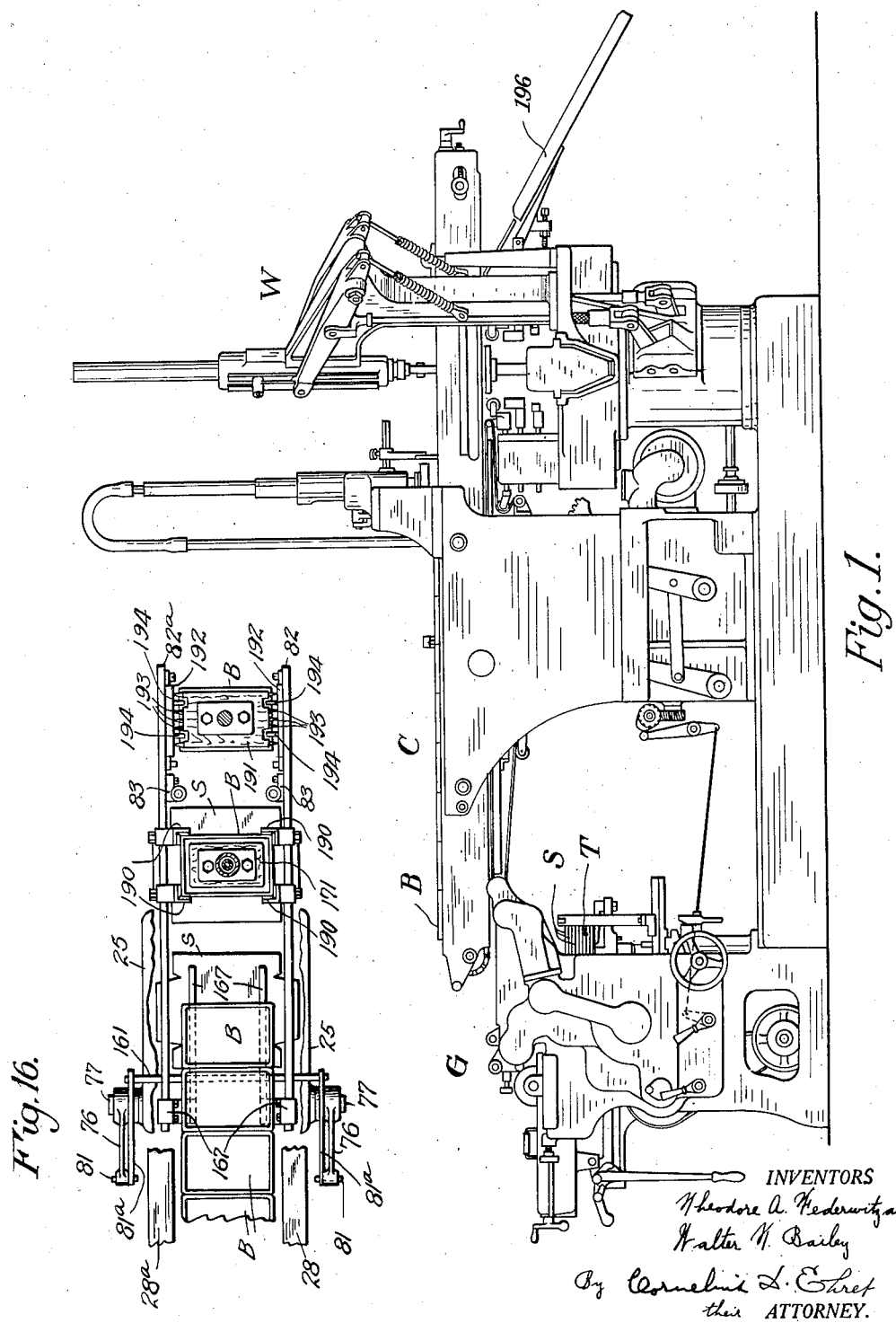
Fig. 1 is a side elevational view of apparatus embodying our invention.
Figure 16 is a plan view, on enlarged scale with parts omitted, of Fig. 1.

Referring to Fig. 1, there is shown an adhesive applying unit G, and a wrapping machine W or equivalent. Unit G and machine W are co-operatively related by mechanism synchronizing the operations or movements of the unit G with the operations or movements of the machine W and with a conveying or transferring unit C which delivers to the wrapping machine W boxes, or equivalent as aforesaid and sheets or equivalent, as aforesaid, the latter gummed or glued and delivered by the unit G to the transferring unit C.

The adhesive applying unit G may be of any suitable type capable of applying adhesive to sheets of box-wrapping paper, or other suitable material, and delivering the gummed sheets in succession at uniform intervals. In the example illustrated the unit G is of the same general type disclosed, for example, in Nitsch and Federwitz Letters Patent 1,472,614 granted October 30, 1923.

The wrapping machine W may be of any suitable character and in the example illustrated is broadly of the type disclosed in prior Letters Patent to Nitsch and Federwitz 1,540,900, and in our prior Letters Patent 1,541,036.

The conveying unit C is generally of the type disclosed in our co-pending applications 698,841 filed May 13, 1924, 40,769, filed July 1, 1925; 70,462, filed November 21, 1925 and 158,183, filed December 31, 1926, and Stokes application 147,405, filed November 10, 1926.

The adhesive applying unit G is driven at suitable speed by any suitable source of power, as a motor 1, and includes apparatus to remove single sheets S from a stack T of unglued sheets. Referring to Fig. 2b, the mechanism which may be of the type described and claimed in co-pending Nitsch and Baker application 3316, filed January 19, 1925, comprises a lever 2 pivoted at 3 to a side frame of a gluer G and rocked by a cam 4 having a slot engaging a roller 5 secured to the lever. The upper end of lever 2 is connected by a link 6 to a carriage member 7 having rollers 8 guided in channels provided by bracket members 9. Movement of the carriage 7 to the right as viewed in Fig. 2b effects upward movement of and rotation of a suction roller 10 adapted to engage the top sheet of the stack near its front edge and to lift it therefrom as the roller 10 moves along the inclined guideway 11, until the point of its travel is reached at which the front edge of the sheet is clamped between the feed roll 12 and co-operating roller 13. The sheet S guided between plates 14 and 15 is engaged by the feed rolls 16 and 17 and moved thereby into engagement with the coated surface of a glue- or adhesive-applying roll 19.

Preferably adhesive is supplied to this roller by mechanism of the type described and claimed in co-pending Federwitz application Serial #187,646, filed April 29, 1927. A constantly rotating agitating roller 20, whose lower surface dips in a reservoir of adhesive within a pan or tank 22, maintains a fountain of adhesive between the constantly revolving rolls 19 and 20, the intermittently rotated roller 21 interposed therebetween forming a scraper to insure a smooth coating on the surface of roller 19. By suitable mechanism, for example similar to that described in our co-pending application Serial #244,124, filed January 3, 1928, the stack T is fed upwardly as sheets S are removed therefrom. The table or support 23 carrying the stack of sheets may be raised or lowered when desired or necessary by manual operation of the hand-wheel 24.

Figures 3, 3A, 3B:
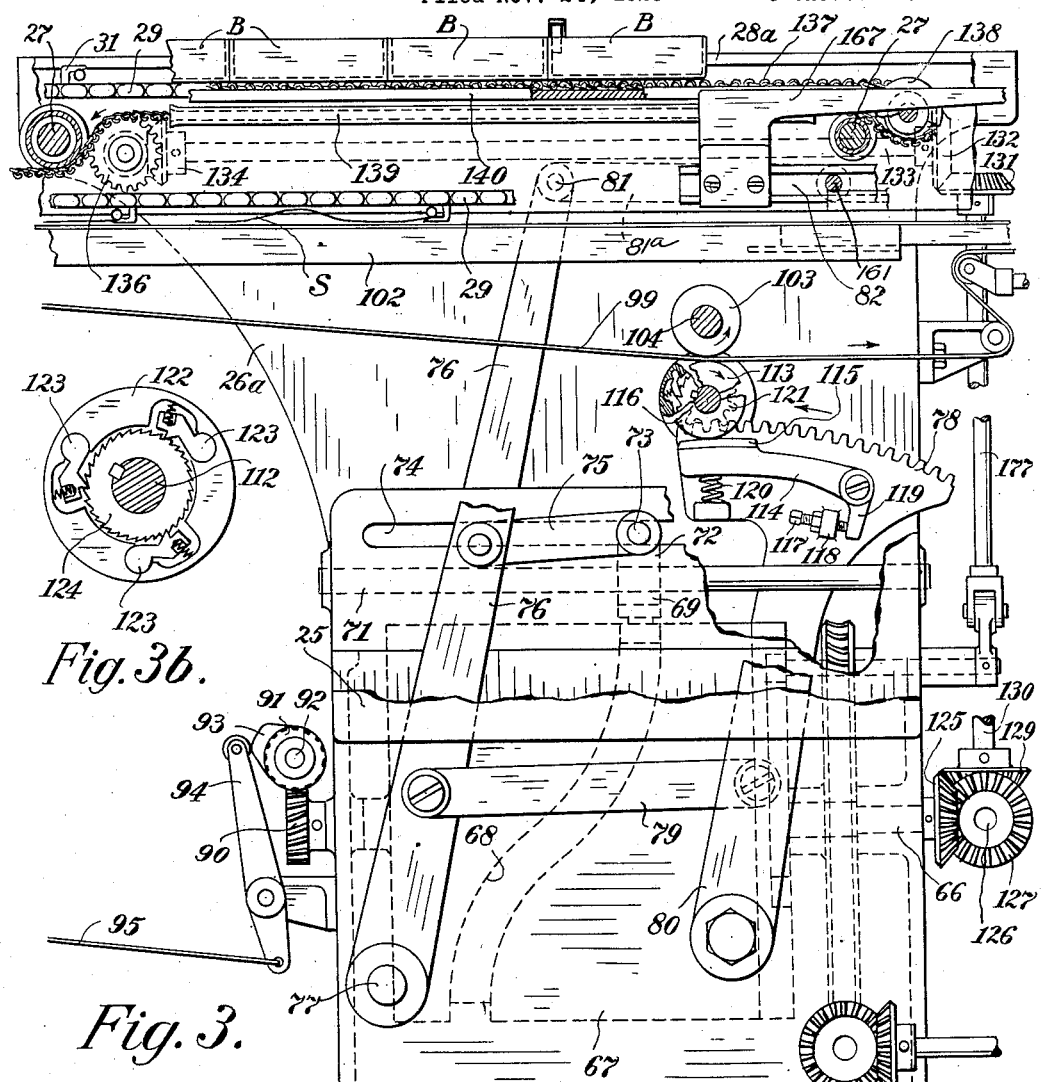
Fig. 3 is a side elevational view, partly in section, of the box and wrapper conveyers shown in Fig. 1 and their operating mechanisms.
Figs. 3a and 3b are detailed views of parts shown in Fig. 3.
Figure 5:
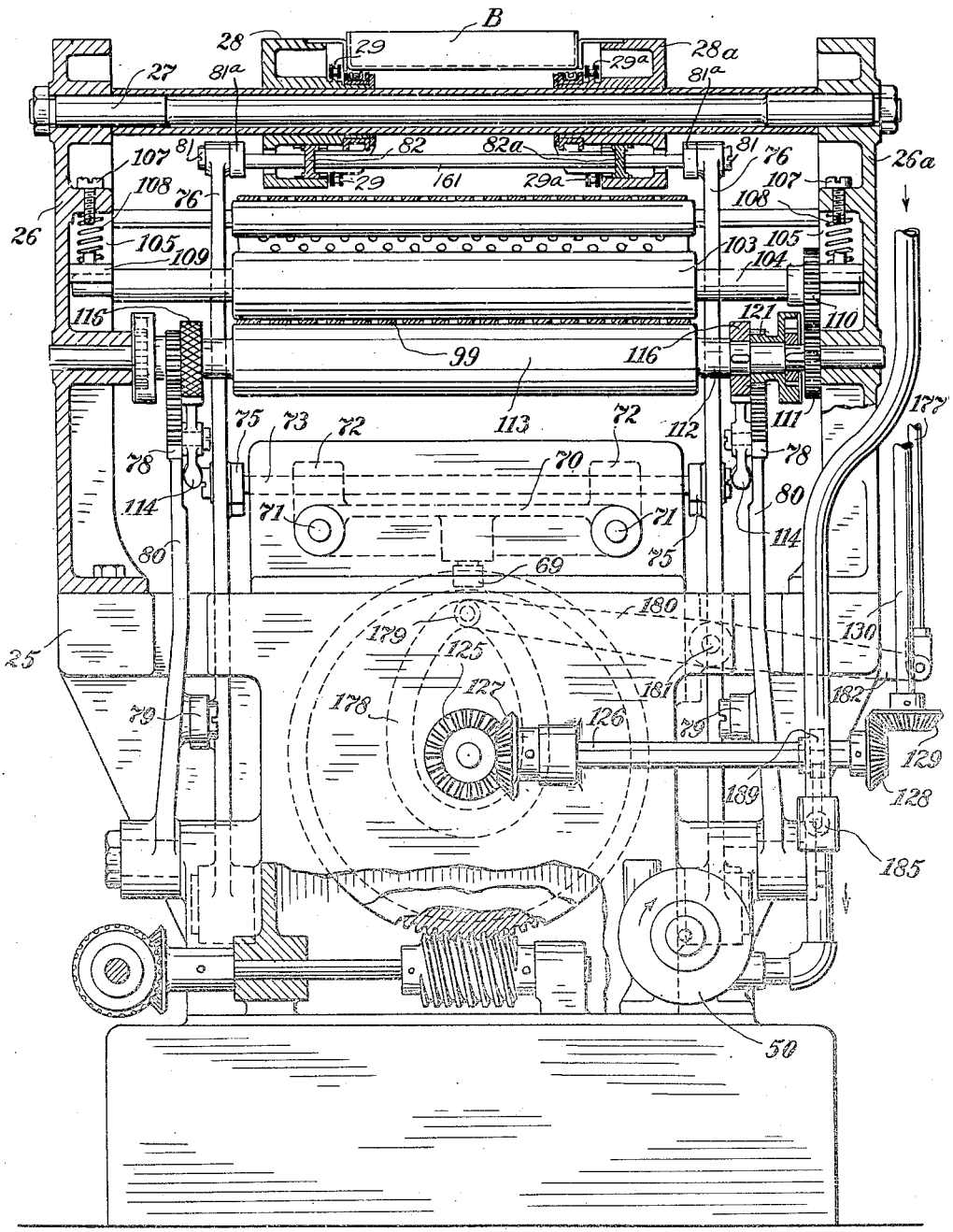
Fig. 5 is a front elevational view of the conveyer mechanism shown in Fig. 3.
Figures 13, 14:
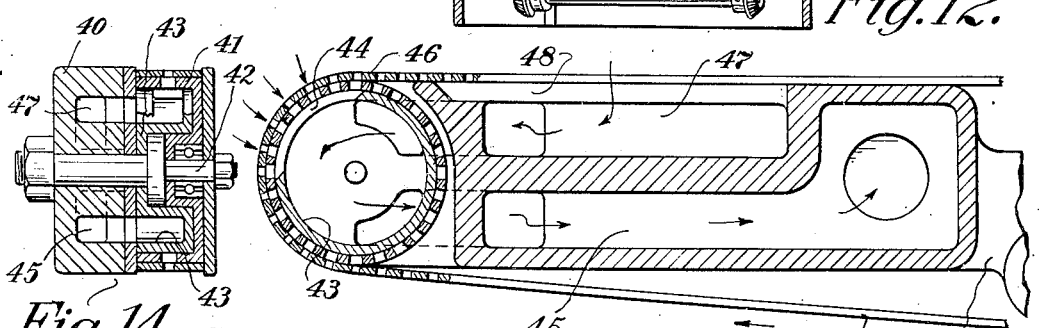
Figs. 13 and 14 are detailed views, in front and side elevation, showing in section, and on enlarged scale, wrapper conveyer mechanism of Figs. 2 and 12.
Figure 15:
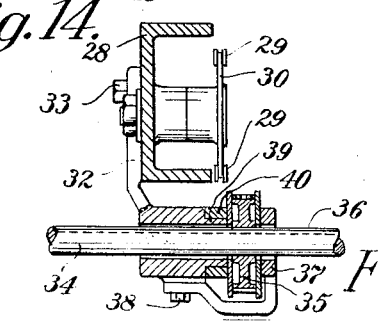
Fig. 15 is a front elevational view partly in section of parts shown in Figs. 2 and 12.

Referring to Figs. 3 and 5, to opposite sides of the conveyer base member 25 and extending upwardly therefrom are the side frames 26 and 26a connected by tie-bolts 27 which pass through and support the adjustable conveyer frames 28 and 28a, each of which is provided with a chain 29 or equivalent, supported by idler sprockets 30 disposed adjacent opposite ends thereof. Sheet-grippers 31, preferably of the character disclosed in our aforesaid co-pending application Serial #40,769 are uniformly spaced along chains for a purpose hereinafter specified. Each frame, as is shown most clearly in Fig. 15, adjacent its end near gluer unit G, is provided with a depending bracket 32 secured thereto as by bolts 33, and through which freely passes the intermittently rotated shaft 34 journaled in the side frames of the gluing machine. A pulley 35 is provided with a slot loosely fitting a key 36, or equivalent, secured to shaft 34, effecting rotation of the pulley with the shaft but permitting its movement longitudinally thereof with bracket 32. A retaining member 37 secured to bracket 32 as by bolt 38 engages one face of the pulley and the bracket 32 the other face thereof. The bracket 32 is provided with a hub portion 39 on which is pivotally mounted a lever 40, to the other end of which, adjacent the roller 19 of the gluer unit G is pivotally mounted for rotation, a suction drum or pulley 41. As illustrated in Fig. 14, the pulley may be mounted on ball bearings the inner race of which is secured to a bolt 42 extending through the lever 40 and clamping thereto a hollow, apertured member 43 having a cut-away portion 44 which permits suction within a compartment 45 of a housing secured to or integral with lever 40 to be applied through perforations of the pulley 41 and of the belt 46, preferably of rubber composition, passing thereover and engaging pulley 35. The hollow member 43 also forms a communicating passage between the lower suction chamber 45 and an upper chamber 47, the latter having a slot 48 which registers or is in alignment with perforations of the belt 46.

Figure 12:
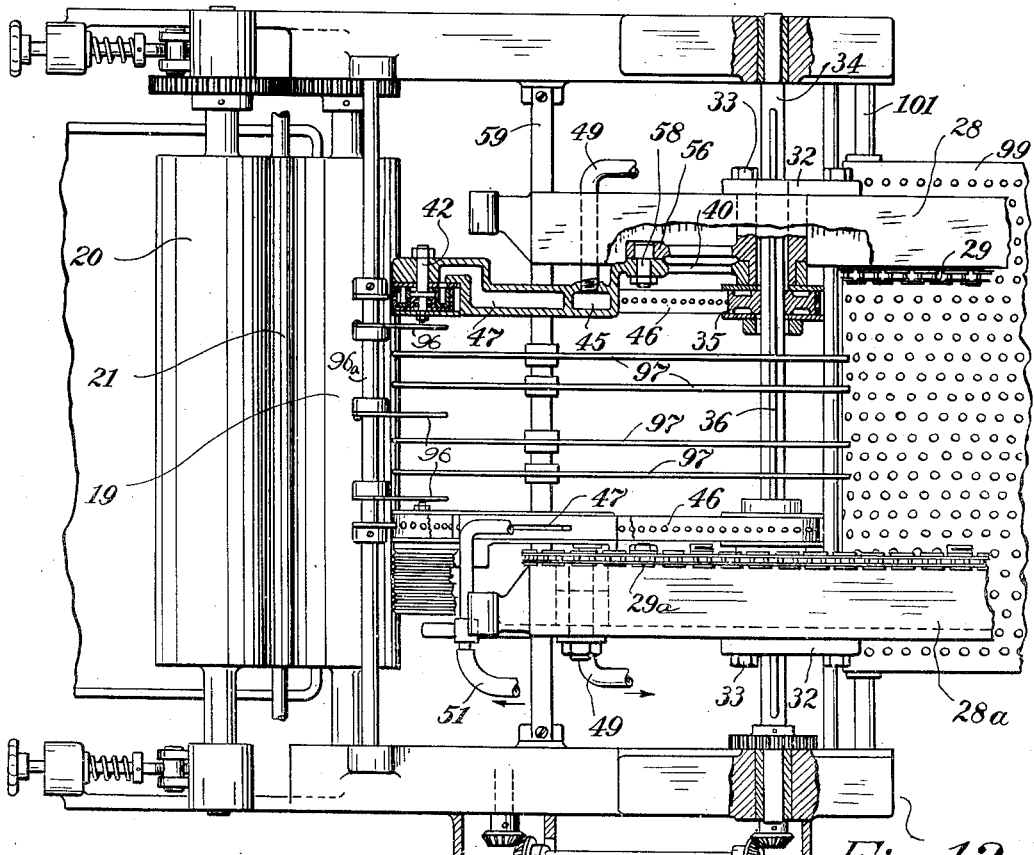
Fig. 12 is a top plan view, with parts in section, of the adhesive applying unit and part of the conveyer mechanism, shown in Fig. 1.

The outlet of chamber 45 may be suitably connected, as by a pipe 49, Fig. 12, to the intake of a blower (not shown), whose outlet side may be connected through a pipe 51 to a tube 52 positioned above lever 40, and provided with a series of holes in its lower surface, opposite belt 46, at least one of which, particularly the one nearest the adhesive applying unit G is or may be provided with a nozzle 53. The pipe 52 is supported by member 54 adjustably clamped to a bar 55 secured to housing 40.

Bracket 32 is provided with an extension 56, Fig. 12, having a slot 57 through which passes a guide bolt 58. Ready access to the rolls of the gluing machine may be had by tilting upwardly either or both of the levers 40 and the conveyer structure carried thereby. A stop bar 59, extending between the side frames of the gluing unit G defines the proper position of lever 40. The belt 46 passes over an idler pulley 60 freely rotatable on bolt or shaft 58, and a tension-adjusting pulley 61 mounted on an end of an arm 62 loosely pivoted on shaft 58. The position of arm 62 and the tension of belt 46 may be varied by adjustment of nut 63 along a threaded bolt 64 passing through arm 62 and extending from a post 65 secured to the lever 40.

Journaled in and extending through the front and rear walls of the conveyer base member 25, is a shaft 66 to which is secured for rotation therewith a cam 67 having a slot 68 in its periphery, the walls of which engage a roller 69 supported by a reciprocable carriage member 70 through which pass at opposite sides thereof the guide rods 71 extending lengthwise of the base member 25 and secured to the front and rear walls thereof. Carriage member 70 is provided with lugs 72 through which passes, transversely of base member 25, an actuating rod 73 extending through slots 74 exteriorly of the hollow base member 25, each end providing a pivot for a link member 75 connecting rod 73 to one of levers 76. Rotation of cam 67 effects oscillation of levers 76 about their pivots 77 which movement is communicated to gear segments 78, 78, by link members 79, 79, each connected to an arm 76 intermediate its ends and to an arm 80 of the gear segment. The upper end of each of the arms 76 is provided with a pin 81 for connecting it through a link member 81a with cross rod 161 passing through bars 82 and 82a, guided by and movable within the U-shaped conveyer frame members 28 and 28a respectively. As shown in Figs. 4b, 5, 7 to 11 and 16, the bars 82 and 82a extend forwardly from cross bar 161 for a substantial distance and to lesser extent rearwardly of cross bar 161. The bars 82 and 82a are each slideable upon the lower inside flange of the corresponding conveyer frame 25.

Referring to Figs. 8 and 9, the frame 28 is shown as supporting a guide tube 83 in which is slidably disposed for vertical movement a locking plunger 84 having a forked lower extension 85 adapted to engage and straddle a pin of the conveyer chains 29. During the forward movement of the bars 82 and 82a, the chains 29 and 29a are connected thereto by the plunger mechanism described for movement therewith. At the end of the forward stroke of arm 76, a cam 86 rocks a lever 87 terminating in a grooved bar 88 extending lengthwise with the conveyer frame and embracing a pin 89 projecting from plunger 84 to lift the pluger 84 out of engagement with the conveyer chains 29 which remain at rest during the return movement of the bars 82 and 82a. It will be understood that this mechanism is duplicated on the conveyer frame 28a. For a more complete explanation of this mechanism, reference is to be had to the aforesaid Stokes application Serial #147,405.

In Fig. 3 a gear 90 secured to the end of shaft 66 adjacent the gluer unit G engages gear 91 to effect rotation of a shaft 92 to which is secured a cam 93, which once for each revolution of conveyer actuating cam 67, rocks a lever 94 connected by a cable 95 or equivalent to tripping mechanism of the gluer unit G, synchronizing feeding of sheets S from stack T thereof on the table 23 of the gluer, and the transportation of sheets by conveyer chains 29. In the operation of the mechanism thus far described, sheets are intermittently and periodically fed from a stack, coated with adhesive and in succession stripped from the adhesive applying roll 19 by the strippers 96. To permit of upward movement of the levers 40 as aforesaid to give access to the bluer roll, the strippers 96 are hinged to stop bar 96a, Figs. 2 and 12. Substantially at the instant of their separation from the adhesive applying roll, the ends of the sheets are forced by suction into engagement with the conveyer belts 46. When on the upper lift of the conveyer belts 46, they are held in engagement therewith in proper position by suction exerted through chambers 47, and held flat thereon by air blast from the orifices in pipes 52. As the rear edge of each sheet passes beyond nozzle 53, at which time its leading edge is in proper position within the jaws of grippers 31, the air blast from the nozzle breaks the vacuum in chamber 47 and thereafter the wrapper is held in engagement with the belts 46 solely by air blast. The guide plates 97 adjustably positioned on cross bar 59 extending transversely of the gluer unit between the side frames thereof support the middle portions of the wrappers to prevent sagging.

When the conveyer chains 29 are stationary, a pair of grippers 31 are in position to receive the forward edge of a sheet or wrapper S conveyed thereto by the belts 46. Thereafter the chains 29 are moved intermittently, carrying the sheet S toward the wrapping machine W by a series of steps of equal length.

The trailing edges of the sheets S are supported by a belt 99 of suitable material, preferably of rubber composition, passing over an idler pulley or roll 100 mounted on a shaft 101 extending between the forward ends of the side frames of the gluer unit G. Perforations in the belt permit suction within a housing 102 to be applied to the wrappers holding them substantially flat in engagement with the belt 99 during the movement with chains 29; i. e., the suction holds the wrappers snugly against the belt 99. Belt 99 passes between an idler, pressure roll 103 secured to a shaft 104 extending between frames 26 and 26a of the conveyer unit; reduced extensions of the shaft being guided in slots 105 and 106 in the side frames. Screws 107 position the springs 108 which are each disposed between a fixed abutment on a frame, and a bearing block 109 disposed within a slot 105 and engaging the upper peripheral surface of the reduced shaft extensions. To the shaft 104 is secured a gear 110 meshing with gear 111 connected to the shaft 112 of a lower roller 113. Upon clockwise movement of gear segment 78, as viewed in Fig. 3, roll 113 rotates in a counter clockwise direction, and upper roll 103 in a reverse direction to move the upper lift of the supporting belt 99 in the same direction and to substantially like extent as conveyer chain 29.

It has been found in practice that as the advancing edge of the wrapper S is held above the belt 99 by grippers 31, their movement causes air to pocket between the wrapper and belt. The position generally assumed by the wrapper is similar to that shown in Fig. 3 in which the rear and front regions of the wrapper are held in engagement with belt 99 by suction, but a substantially middle portion is raised therefrom. This deformation prevented proper register with the box it was adapted to cover. To flatten the wrapper, preferably while the conveyer chains are at rest, the belt 99 is moved in a reverse direction to a suitable extent dragging the rear edge of the wrapper and bringing the entire surface thereof flat into engagement with the conveyer belt. A suitable mechanism for effecting this reverse movement of belt 99 includes members 114, each pivoted to gear segment 78 and having a friction surface 115 adapted to engage the knurled surface of a disc 116 secured to shaft 112, the duration or length of engagement being adjustable by a bolt 117, or equivalent, threadably engaging an integral projection 118 of the gear segment 78 and abutting an arm 119 of the lever. A spring 120 or equivalent biases the lever 114 into engagement with the co-operating disc 116.

Gear segment 78 meshes with a gear 121 to which is secured or is integral therewith, a clutch member 122 carrying the spring biased pawls 123 engaging the teeth of a ratchet 124 keyed to shaft 112. During clockwise rotation of gear segment 78, movement is communicated to the rollers 113 and 103 through the pawls 123 and ratchet 124 to shaft 112. During reverse movement of gear segment 78, movement of suitable length is imparted to belt 99 by engagement between the friction faces 115 of levers 114 and the knurled disc 116 directly connected to shaft 112, the pawls 123 moving idly over the teeth of ratchet 124.

To the end of shaft 66 adjacent the wrapping machine W is secured, exteriorly of the conveyer base structure 25, a bevel gear 125 driving a shaft 126 through a co-operating bevel gear 127. To the opposite end of shaft 126 is connected a gear 128 in engagement with and driving a gear 129 secured to shaft 130 to the upper end of which is fastened a miter gear 131 driving a gear 132 fastened to one end of a shaft 133, to the other end of which is secured bevel gear 134, driving through a gear not shown a sprocket 136. A box conveyer chain 137, or equivalent, as a tape or belt, supported at ends of the conveyer frame 28 by idler pulleys 138 engages sprocket 136 and is continuously driven thereby. Tubes 139 surround the lower lift of conveyer chain 137 in regions where there might be danger of interference between the chain and other moving parts of the mechanism. The upper lift of the box conveyer chain 136 is supported by a grooved ledge 140 extending outwardly from the conveyer frame 28. It will be understood that there is associated with the conveyer frame 28a a like box conveyer chain and operating mechanism. With each or both conveyer frames there is associated a box release pin 141, see Fig. 3a, carried by a reciprocating rack bar 142 engaged by gear segment 143. Periodically a cam 144 engaging a pin 145 projecting from a spring biased lever 146, transmits movement through a link 147 connected between the upper ends of arms 146 and an arm 148 rigidly secured to or integral with gear segment 143 to bar 142 effecting upward movement of pin 141, releasing a box B held thereby for movement with conveyer chain 137.

Referring to Figs. 10 and 10a, there is shown a pair of spaced plates 149 extending between tie bolts 27 and connected as by screws 150 to opposite sides of spacing abutments 151 integral with collar members 152 substantially centrally secured to bolts 27 by locking screws 153. The plates 149 are provided with slots 154 which guide a pin 155 projecting through and beyond a tiltable member 156 disposed between the spaced plates 149. The lower end of an arm 157 projecting downwardly from member 156 is engaged by a rod 158 connected to the outer end of an arm 160 pivotally mounted on a bar 161 whose ends are secured to bars 82 and 82a respectively. A pin 163 passes through and extends from member 156 to engage cam slots 164 of the spaced plates 149, so that during forward movement of arm 76, the member 156 moves upwardly about pin 155 as a pivot, the finger 165 secured thereto and having an upwardly extending projection 166 engages a released box on conveyer chain 137, the box being supported by brackets 167 and 167a clamped or otherwise secured to bars 82 and 82a. During the reverse movement, member 156 moves downwardly to clear the box being retained by stop pin 141.

At the end of forward movement of lever 76, the box B, as shown in Fig. 11, is supported by brackets 167 and 167a in position against a stop plate 168 adjustably secured to a rod 169 extending outwardly from a guide column 170, in registering relation with a block 171. Slidably disposed within the column for vertical movement is a hollow plunger 172 from which outwardly projects, through a slot in column 170, a pin 173 on which is pivotally mounted one end of a link 174 whose other end is suitably connected to a lever 175 pivoted to the frame member 26a as at 176, the other end of the lever being connected to link rod 177. The face of cam 67 adjacent the wrapping machine W is provided with a cam slot 178 with which co-operates a roller 179 on the end of a lever 180 pivoted at 181 and having an arm 182 which connects with the lower end of link rod 177 to effect reciprocation of block actuating plunger 172.

The interior of hollow plunger 170 is in communication through flexible pipe 183 with a source of suction, as the pump 50, so that when the block 171 is moved by plunger 170 downwardly into engagement with the bottom of box B, suction is applied through the tube 184 projecting from the lower end of the plunger and resiliently mounted therein, to support the box B during and after movement of brackets 167 and 167a out of engagement therewith by return movement of levers 76.

As shown most clearly in Fig. 10, continued downward movement of plunger 172 with box B and held in engagement therewith effects engagement between the exterior, bottom side of the box and the coated surface of a wrapper S held by the grippers 31 of the stationary chain 29. The wrapper, flattened on belt 99 by reverse movement thereof as above explained, and held flat by suction (Fig. 7) meets squarely the bottom of box B and registers properly therewith. A valve 185 normally closed by a spring 186 is opened by an actuating lever 187, having a roller 188 in engagement with a cam 189, secured to and rotatable with shaft 126, to destroy the suction applied to box B permitting the box to remain in engagement with the wrapper during upward, return movement of block 171 by plunger 172. The box aligning plates 190 secured to bars 82 and 82a through or between which box B has been moved by block 171, hold the box in position in engagement with the wrapper during subsequent movement of the bars 82 and 82a, and chains 29 toward wrapping machine W, as effected by forward movement of lever 76. As the box and wrapper move from the position shown in Fig. 10 toward the form-block, the suction exerted from chamber 102 through belt 99 holds the free, or unapplied portions of the wrapper flat against the belt.

The box with the wrapper adhering to its bottom is held stationary in the path of the descending form block structure 191 of the wrapping machine W which engages box B pushing it out of engagement with the plates 190 and moving it together with the adhering wrapper downwardly between the various box wrapping instrumentalities for folding the panels of the wrapper into adhesive engagement with the box, as is well understood in the art. In the meanwhile the bars 82 and 82a have been moved to the left as viewed in Fig. 4, (the plates 190 clearing the plunger supporting the upper form block 191) bringing the stripper members 192 carried thereby, and having the stripping brushes 193, into the path of movement of the ascending box to remove it from the upper form block structure 191. The stripper members 192 are provided with projecting pins or abutments 194 which pass freely through slots 195 of the ascending form block structure but which engage and positively strip the box B therefrom, particularly if brushes 193 have failed so to do. The mechanism for operating the box wrapping instrumentalities for reciprocating the form block structure may be of any suitable type, for example of the character disclosed in our aforesaid Letters Patent 1,541,036. During the succeeding forward movement of the bars 82 and 82a, the completed wrapped box B is ejected from the wrapping machine and slides down a suitable chute 196.

Conveyer frames 28 and 28a are adjustable on tie bolts 27 to adapt the conveyer C for use with boxes and wrappers of widely variant dimensions. The necessity of a multitude of adjustments in adjusting the machine to operate upon boxes of different sizes is obviated in the construction shown by mounting of all the box and wrapper conveying instrumentalities, as wrapper conveyer chains 29, box conveyer chains 137, box supporting brackets 167 and 167a, etc. on the conveyer frames 28 and 28a for movement therewith. Reference is made to our aforesaid pending application Serial No. 137,668 for a more detailed description of mechanism for effecting adjustment of the conveyer frames.

What we claim as our invention is:

1. In the art of wrapping boxes, the method which comprises moving boxes and individual wrappers in the same direction toward a wrapping station, during intervals in which the wrappers are stationary, effecting adhesive engagement between wrappers in succession and individual boxes, and continuing moving the boxes and adherent wrappers in said direction as units in succession to the wrapping station.

2. In the art of wrapping boxes, the method which comprises moving a wrapper along a path, retaining a box by suction during its movement in a path intersecting the path of movement of the wrapper, effecting registering relation of the box and wrapper, thereafter discontinuing the suction to release the box, and subsequently moving the box and wrapper without change of relative position toward a wrapping station.

3. In the art of wrapping boxes, the method which comprises moving a wrapper along a path, retaining a box by suction during its movement in a path intersecting the path of movement of the wrapper, effecting adhesive engagement between the box and wrapper, thereafter discontinuing the suction to release the box, and subsequently moving the box and adherent wrapper toward a wrapping station.

4. Mechanism for wrapping boxes comprising wrapping machine form block structure, means for intermittently moving a wrapper along a path, means for moving a box into adhesive engagement with said wrapper while stationary, and means for effecting movement of said box and wrapper together into the path of movement of said form block structure.

5. Mechanism for wrapping boxes comprising wrapping machine form block structure, means for intermittently moving a wrapper along a path, reciprocating means effective in one direction of movement to move a box into adhesive engagement with said wrapper while stationary, and reciprocating means for effecting movement of said box and wrapper together into the path of movement of said form block structure.

6. Mechanism for wrapping boxes comprising movable structure positively engaging a wrapper to effect movement thereof, means for supporting said wrapper and normally moving in the same direction as said wrapper, suction means to hold the wrapper in engagement with said supporting means, and means to effect reverse movement of said supporting means of suitable extent to flatten the wrapper thereon.

7. Mechanism for wrapping boxes comprising conveyer chains, gripper elements carried thereby adapted to clamp the forward edge of a wrapper, a supporting belt normally moving in the same direction as said wrapper, means to apply suction through said belt to said wrapper, and means to effect reverse movement of said belt of suitable extent to flatten the wrapper thereon.

8. Mechanism for wrapping boxes comprising intermittently movable structure positively engaging a wrapper to effect movement thereof, means for supporting said wrapper and movable in the same direction as said structure during movement thereof, and mechanism to effect movement of said means in a reverse direction while said structure is stationary to flatten said wrapper.

9. Mechanism for wrapping boxes comprising conveyer chains, gripper elements carried thereby adapted to clamp an edge of a wrapper, means to effect intermittent movement of said chains, a belt supporting said wrapper, means to apply suction through said belt to said wrapper, and means to effect movement of said belt in the same direction as said wrapper during movement of said conveyer chain, and in a reverse direction while said conveyer is at rest.

10. Mechanism for wrapping boxes comprising conveyer structure engaging a wrapper to effect movement thereof, means supporting and normally moving in the same direction as said wrapper, means to apply suction to said wrapper to hold it against said means, means to effect reverse movement of said supporting means of suitable extent to flatten the wrapper, and means operating in timed relation to said conveyer structure to effect engagement between a box and the flattened wrapper.

11. Mechanism for wrapping boxes comprising conveyer structure engaging a wrapper to effect movement thereof, mechanism to effect intermittent movement of said structure, means supporting said wrapper and movable therewith, means to apply suction to said wrapper to hold it against said means, means to effect reverse movement of said supporting means while said conveyer structure is at rest to flatten the wrapper, and means operating in timed relation to said conveyer structure to effect engagement between a box and the stationary, flattened wrapper.

12. Mechanism for wrapping boxes comprising form-block structure, movable plunger structure adapted to carry a box, means for holding a wrapper in registering relation to a box transported by said plunger, and means for effecting movement of said box and wrapper in said relation into the path of movement of said form-block structure.

13. Mechanism for wrapping boxes comprising form-block structure, movable plunger structure adapted to carry a box, means for holding a coated wrapper in position for engagement by a box transported by said plunger, and means for effecting movement of said wrapper and adherent box into the path of movement of said form-block structure.

14. Mechanism for wrapping boxes comprising form-block structure, conveyer mechanism for intermittently and simultaneously moving a plurality of wrappers toward said form-block structure, a reciprocating plunger for transporting boxes in succession into registering relation with a corresponding wrapper while said conveyer is at rest, and means effecting movement in succession of said boxes and wrappers in said relation into the path of movement of said form-block structure.

15. Mechanism for wrapping boxes comprising form-block structure, an endless conveyer for wrappers, and reciprocating structure operating in timed relation to said form-block structure connected to said conveyer when moving in one direction to deliver wrappers carried thereby successively into the path of movement of said form-block structure.

16. Mechanism for wrapping boxes comprising form-block structure, an endless conveyer for wrappers, reciprocating structure for transporting boxes into the path of movement of said form-block structure, and means connecting said conveyer to said reciprocating structure during its movement toward said form-block structure simultaneously to deliver a wrapper.

17. Mechanism for wrapping boxes comprising vertically reciprocable form-block structure, a vertically reciprocable plunger adapted to carry a box, and conveyer mechanism for transporting wrappers beneath said plunger to effect registering relation with a box and thereafter during maintenance of said relation into the path of movement of said form-block structure.

18. Mechanism for wrapping boxes having a grooved form block, a box transporting plunger, and structure movable in one direction to carry unwrapped boxes from said plunger into the path of movement of said form block and in a reverse direction to bring abutments thereof into register with grooves of said form block to strip wrapped boxes therefrom.

19. Mechanism for wrapping boxes having a grooved form block, a box transporting plunger, structure movable in one direction to carry unwrapped boxes from said plunger into the path of movement of said form block and in a reverse direction to bring abutments thereof into register with grooves of said form block to strip wrapped boxes therefrom, an endless conveyer for wrappers, and means intermittently connecting said structure to said conveyer to effect simultaneous delivery of wrappers and boxes in said path.

20. In the art of wrapping boxes, the method which comprises applying suction positively to hold an individual wrapper against a traveling surface, and bringing box structure into adhesive registered engagement with part of the wrapper upon which suction is acting.

21. In the art of wrapping boxes, the method which comprises supporting an individual wrapper by a moving surface, applying suction positively to hold substantially all of the wrapper firmly against said surface during movement of the wrapper therewith, and registering a box on the wrapper while supported by said surface.

22. In the art of wrapping boxes, the method which comprises supporting an individual wrapper by a moving surface, applying suction to hold the wrapper against said moving surface, while said wrapper is so held against said surface bringing a box element into registering engagement with part of the wrapper acted upon by suction, and thereafter moving the assembly to a wrapping station.

23. In the art of wrapping boxes, the method which comprises supporting an individual wrapper by a moving surface, applying suction to hold the wrapper against said surface, bringing a box element into registering engagement with the wrapper during application of suction thereto, and thereafter moving them together during application of suction to flatten the unapplied portions of the wrapper against said surface.

24. In the art of wrapping boxes, the method which comprises supporting an individual wrapper by a moving surface, applying suction to substantially all of the wrapper to hold it against said surface, bringing a box element into registering engagement with the wrapper during application of suction, and subsequently, after discontinuance of suction, moving them together to a wrapping station for completion of application of the wrapper.

25. In the art of wrapping boxes, the method which comprises supporting an individual wrapper by a moving surface, applying suction to hold the wrapper against said surface, bringing a box element into registering engagement with the wrapper during application of suction, continuing application of suction to hold unapplied portions of the wrapper against said surface during further movement of the box element and wrapper together, and after discontinuance of suction completing application of the wrapper.

26. In the art of wrapping boxes, the method which comprises effecting intermittent movement of an individual wrapper supported by a moving surface, applying suction positively to hold the wrapper against said surface, and bringing a box element into registering adhesive engagement with the wrapper while stationary and during continued application of suction to wrapper areas engaged by the box.

27. In the art of wrapping boxes, the method which comprises supporting an individual wrapper by a moving surface, effecting registered adhesive engagement between box structure and the wrapper, and applying suction to hold unapplied portions of the wrapper against said surface.

28. In a box wrapping system, a conveyer for simultaneously transporting a plurality of box wrappers, and means for transporting a box element into registering engagement with each of the wrappers in succession while disposed substantially in a plane on said conveyer.

29. In a box wrapping system, a traveling belt, and means for bringing box elements into registering adhesive engagement with wrappers supported by said belt.

30. In a box wrapping system, a traveling belt, means for exerting suction through said belt upon wrappers in contact therewith, and means for bringing box elements into registering engagement with said wrappers while in contact with said belt.

31. In a box wrapping system, an endless conveyer for transporting box wrappers, mechanism for effecting intermittent movement of said conveyer, and means for effecting registering engagement of box elements with wrappers while on said conveyer and while said conveyer is at rest.

32. In a box wrapping system, an endless belt for supporting box wrappers, suction means for holding wrappers against said belt, mechanism effecting intermittent movement of said belt, and means for effecting registering engagement between box elements and wrappers upon said belt, while said conveyer is at rest.

33. In a box wrapping system, wrapper applying mechanism, a belt traveling towards said wrapper applying mechanism, and means for registering box elements upon wrappers supported by said belt for movement therewith toward said mechanism.

34. In a box wrapping system, wrapper applying mechanism, a belt traveling toward said wrapper applying mechanism, means for registering box elements upon wrappers supported by said belt for movement therewith toward said mechanism, and suction means for holding the wrappers against said belt before engagement with said box elements and for thereafter holding the unapplied portions of the wrapper against said belt.

35. A box wrapping system comprising means for applying a coating of adhesive to box wrappers, a belt traveling from said adhesive applying means, means for bringing box elements into engagement with coated wrappers while in contact with said belt, to effect partial application of the wrappers, and mechanism for thereafter completing application of the wrappers.

36. A box wrapping system comprising a traveling belt, means for applying suction to hold wrappers against said belt, means for bringing box elements into engagement with wrappers upon said belt to effect partial application of the wrappers, and mechanism for completing application of the wrappers after release from suction.

37. In a box wrapping system, a conveyer for transporting adhesive coated wrappers and including means for applying suction to said wrappers, a second conveyer for transporting wrappers received from said first conveyer and including suction means for holding the wrappers, and means for aligning each wrapper before its transport by said second conveyer and after its release from the influence of said first suction means.

38. In a box wrapping system, a conveyer for transporting adhesive coated wrappers and including means for applying suction to said wrappers, a second conveyer for transporting wrappers received from said first conveyer and including suction means for holding the wrappers, means for aligning each wrapper before its transport by said second conveyer and after its release from the influence of said first suction means, and means for bringing box elements into registering engagement with the wrappers while on said second conveyer.

39. In a box wrapping system, a traveling belt supporting box wrappers, means for bringing a box element into registering engagement with each of the wrappers in succession while on said belt, and mechanism for transporting the box element and wrapper together from the position at which their engagement is effected by said means.

40. In a box wrapping system, wrapper applying mechanism including a form block, a belt traveling adjacent said form block and upon which box wrappers and box structure are assembled in registering engagement, and reciprocating mechanism for feeding a box and wrapper together in registering engagement from said conveyer to said form block.

41. In a box wrapping system, wrapper applying mechanism including a form block, a belt traveling adjacent said form block, suction means for holding wrappers against said belt, means for registering a box element upon each of the wrappers while supported by said belt, and mechanism for feeding the box element and wrapper together in registering engagement from the belt to said form block.

42. In a box wrapping system, wrapper applying mechanism including a form block, a belt traveling adjacent said form block, suction means for holding wrappers against said belt, means for registering a box element upon each of the wrappers while supported by said belt, and mechanism for feeding the box element and wrapper together in registering engagement from said belt to said form block over a zone free of suction.

43. In a box wrapping machine, the combination of a belt upon which the covering sheets and boxes are assembled, wrapper applying mechanism adjacent said belt and including a vertical reciprocating plunger head, and means for transferring said assembled boxes from said belt to said wrapper applying mechanism comprising reciprocating structure having elements holding said box during its transfer from said belt.

44. In a box wrapping machine, wrapper applying mechanism, a belt traveling toward said mechanism, means for applying suction through said belt to hold wrappers thereon, and reciprocating means for transferring from said belt to said mechanism, assemblies each comprising a wrapper and box brought into adhesive engagement therewith while on said belt.

45. In a box wrapping machine, wrapper applying mechanism, a belt traveling toward said mechanism, and reciprocating means for transferring from said belt to said mechanism, assemblies each comprising a wrapper and a box brought into adhesive engagement therewith while on said belt.

46. Mechanism for wrapping boxes having a grooved form block, means for reciprocating said form block, slide structure, mechanism for reciprocating said slide transversely of the path of said form block, and relatively fixed abutments carried by said slide and adapted to be received by grooves of said form block for stripping a wrapped box therefrom.

47. Mechanism for wrapping boxes comprising spaced conveyers, a grooved form block, separate supporting members for said conveyers, a reciprocating slide carried by each of said supporting members, and provided with abutment structure adapted to be received by the grooved form block to strip a wrapped box therefrom, and means for moving said supporting member toward and away from the form block simultaneously to adjust the conveyers and box-stripping abutments.

48. A box wrapping system comprising means for applying a coating of adhesive to box wrappers, a belt travelling from said adhesive applying means, means for bringing box elements into engagement with coated wrappers while in contact with said belt, and wrapper-applying mechanism for thereafter effecting further application of the wrappers to the box elements.

49. In a box wrapping system, a conveying system for transporting a wrapper toward a wrapping station and including a suction belt, means for bringing box structure into engagement with said wrapper while supported by said belt, and means for aligning the wrapper before its engagement by said box structure.

50. In the art of applying gummed sheets to box walls, the method which comprises registering a box element upon a portion of gummed sheet material to constitute an assembly, thereafter conveying the assembly while upon a moving surface, simultaneously holding the unapplied portion of the sheet material upon said surface, and thereafter completing the application of the sheet material by applying to box walls the previously unapplied portion of the sheet.

51. Apparatus for applying gummed sheet material to box walls comprising a conveyer having a surface upon which are carried in succession assemblies of box elements with partially applied gummed sheet material, means for holding the unapplied portions of the sheet material of said assemblies against said surface, and means for thereafter completing the application of the gummed sheet material to the box walls.

52. A box wrapping system comprising means for transporting box and wrapper assemblies toward a wrapping machine, and means operating in timed relation to said wrapping machine for transferring thereto the assemblies in succession from said transporting means.

53. A box wrapping system comprising means including belt structure for transporting box and wrapper assemblies toward a wrapping machine, means for applying suction to hold unapplied portions of the wrappers against said belt structure, and means operating in timed relation to said wrapping machine for transferring thereto in succession the assemblies from said transporting means.

54. In a box wrapping system, a conveying system for transporting a wrapper toward a wrapping station including belt structure, means for bringing box structure into engagement with said wrapper while supported by said belt structure, and means for aligning the wrapper on said belt structure before its engagement by said box structure.

THEODORE A. FEDERWITZ.
WALTER T. BAILEY.